Figure 3:
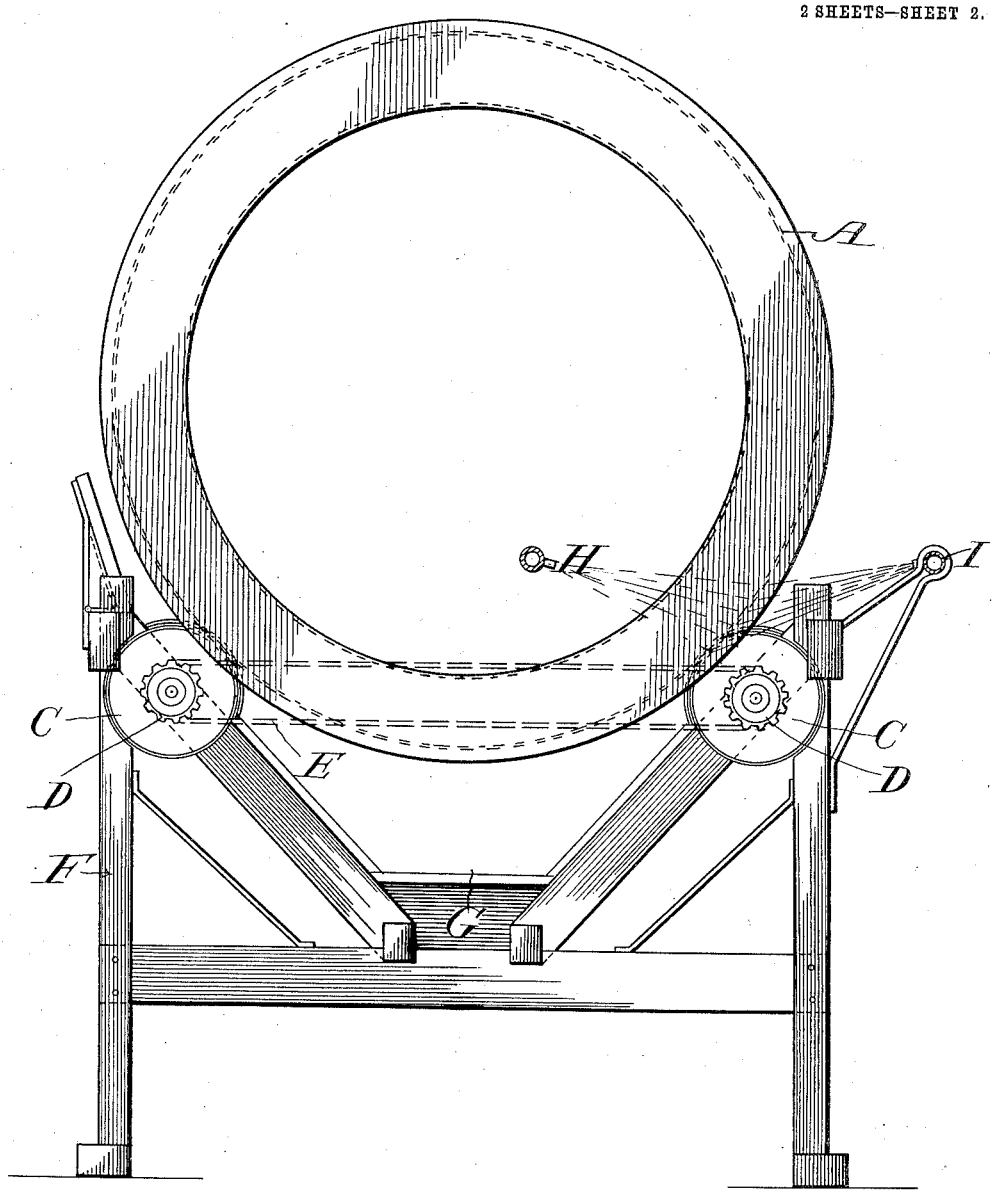

E. J. JUDGE.
VEGETABLE WASHER.
APPLICATION FILED OCT. 5, 1908.
958,812.
Patented May 24, 1910.
2 SHEETS—SHEET 1.
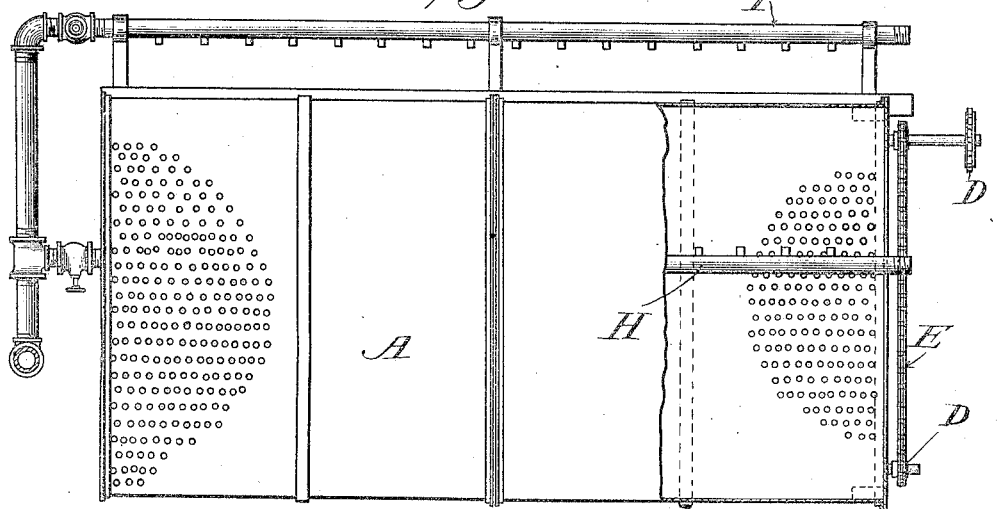
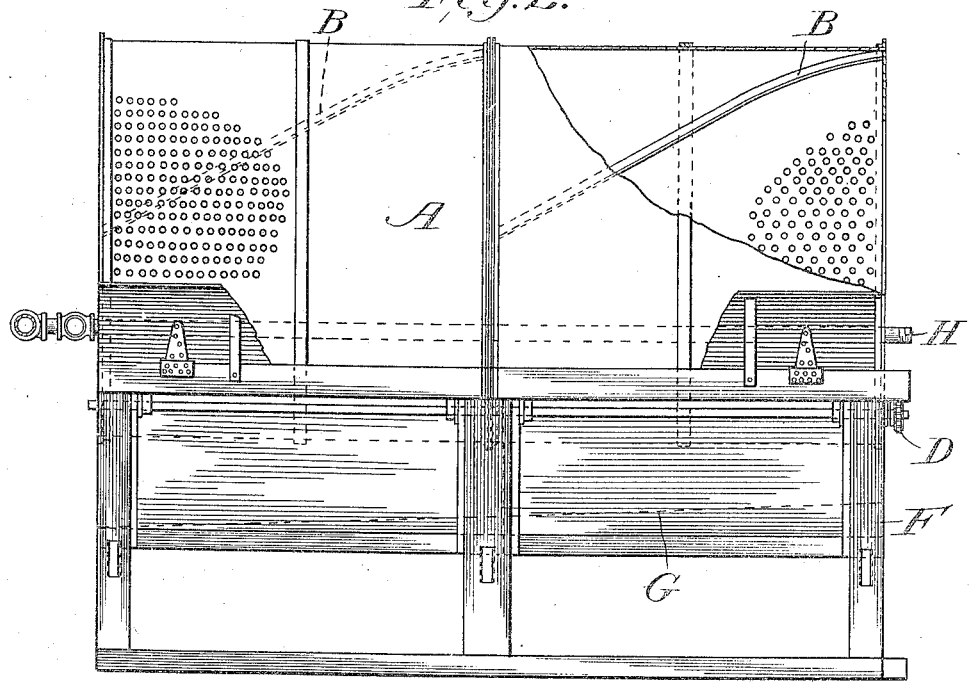
Witnesses
Inventor
Edward J. Judge,
By J. Walter Fowler
Attorney

UNITED STATES PATENT OFFICE.

EDWARD J. JUDGE, OF SAN FRANCISCO, CALIFORNIA.

VEGETABLE-WASHER.

958,812.  Specification of Letters Patent.  Patented May 24, 1910.

Application filed October 5, 1908. Serial No. 456,149.

*To all whom it may concern:*

Be it known that I, EDWARD J. JUDGE, a citizen of the United States, residing in the city and county of San Francisco and State of California, have invented certain new and useful Improvements in Vegetable-Washers, of which the following is a specification.

My invention relates to a machine designed, primarily, for washing soft-leaved vegetables, such as spinach, and the invention comprehends a rotatable perforated or foraminous carrier having internal means for advancing the spinach therethrough, and internal and external spray pipes, one set of which is adapted to deliver fluid jets outwardly upon the vegetables to wash the same, while another set is designed to deliver inwardly upon the outside of the perforated carrier to keep the meshes or perforations of the latter free and unobstructed and to prevent the leaves of the vegetables being treated from being driven into or adhering to the inside of the carrier and being torn or injured thereby.

Figure 1 is a plan view of a spinach washing machine embodying the salient features of my invention. Fig. 2 is a side elevation of the same.

The carrier herein shown comprises a horizontally-disposed revoluble drum, A, which may represent one form of carrier capable of carrying out my invention. This drum is formed of foraminous or perforated material of some appropriate type, and along its interior there will be secured appropriate flanges, B, of substantially spiral form, for directing the vegetables through the carrier from end to end thereof as said carrier rotates. Any suitable means may be employed for mounting and rotating the carrier; for instance in Fig. 3, I show the drum or carrier as being mounted upon bearing wheels, C, placed at opposite sides of the center and beneath the lower portion, these wheels being mounted on shafts which are provided with sprocket wheels, D, around which passes a chain, E, said wheels, C, frictionally engaging the periphery of the drum and thereby rotating said drum as power is communicated through the wheels thereto. The drum is mounted in a suitable stationary frame, F, and in this frame beneath the drum is a trough or hopper, G, which receives the drainings and wash water delivered through the perforations of the drum.

Passing longitudinally through the drum is a spray pipe, H, or a series of said pipes, which connects with a suitable source of water-supply, and when the drum is in motion and the spinach is agitated and tumbled about therein, the spinach is brought in contact with the hydraulic jets delivered from said pipe and the dirt or grit which the spinach contains is loosened and eliminated and finally discharged through the perforations of the drum into the trough or hopper underneath above mentioned. In order that the jets delivered from the hydraulic spray-pipe may not cause the spinach to be driven against the inner side of the drum and more or less into the perforations, thereby causing the spinach to adhere to the inner wall of the drum and the young leaves to be torn by the frictional or other engagement with the inner wall of said drum, I prefer to arrange along the outside of the drum, a second spray pipe, I, or a series of such pipes, which is also connected with the source of water supply, and is adapted to deliver jets against the outside of the drum, whereby these exterior jets by passing inwardly through the perforations of the drum serve to maintain said perforations clear and unobstructed and to prevent the spinach adhering to the inner side of said drum. The second-named sprays operate more or less in opposition to the first-named sprays and they assist in effecting a complete washing of the spinach, but their primary object is to prevent the clogging of the meshes or perforations in the drum and to prevent the adherence of the young leaves to the inner side of the drum and the consequent injury to said leaves. While the spinach is thus being passed through the drum, it is effectually washed by the hydraulic sprays and by the time it reaches the delivery end of said drum, the spinach has been completely washed and all grit and foreign matter removed therefrom.

By reason of the foregoing construction and particularly the arrangement of interior and exterior spray-pipes throwing their jets in opposite directions, the inner and outer sides of the spinach-leaves are subjected to the cleansing action of the water and the young leaves, which would be forcibly thrown against the inside of the drum and more or less into the perforations thereof, will be kept from clinging to the drum and being torn or bruised thereby.

Spinach and other leaved vegetables treated as above described will thus be in a better and more attractive condition for subsequent partial cooking and canning, while the loss in young tender leaves and sprouts is reduced to a minimum.

Having thus described my invention what I claim and desire to secure by Letters Patent is:—

An improved vegetable washer having in combination a revoluble, perforated drum having means for advancing the vegetable therethrough, a spray pipe within the drum adapted to deliver fluid jets outwardly against the vegetable and toward the opposed inner wall or surface of the drum, and a second spray pipe outside the drum adapted to deliver fluid jets against the outer wall or surface of said drum substantially in a direction opposite to the jets of the first-named spray pipe, said second jets serving as cleaners of the perforations of the drum and also to prevent the leaves of the vegetable clinging to the opposite or inner surface of said drum.

In testimony whereof I affix my signature in presence of two witnesses.

EDWARD J. JUDGE.

Witnesses:
  A. MARIE FITZBERGER,
  B. ROSENHEIM.